United States Patent
Atluri et al.

(10) Patent No.: US 9,796,286 B2
(45) Date of Patent: Oct. 24, 2017

(54) ENERGY USE AGGREGATION AND CHARGE CONTROL OF A PLUG-IN ELECTRIC VEHICLE

(71) Applicant: GM GLOBAL TECHNOLOGY OPERATIONS LLC, Detroit, MI (US)

(72) Inventors: Venkata Prasad Atluri, Farmington Hills, MI (US); Ian J. Sutherland, Grosse Pointe, MI (US); Russ Eling, Lasalle (CA); Alexander D. Keros, Redondo Beach, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 384 days.

(21) Appl. No.: 14/597,286

(22) Filed: Jan. 15, 2015

(65) Prior Publication Data

US 2016/0207413 A1 Jul. 21, 2016

(51) Int. Cl.
*H02J 7/00* (2006.01)
*B60L 11/18* (2006.01)
*H04L 29/06* (2006.01)
*H04L 29/08* (2006.01)

(52) U.S. Cl.
CPC ....... *B60L 11/1848* (2013.01); *B60L 11/1809* (2013.01); *B60L 11/1838* (2013.01); *H02J 7/0052* (2013.01); *H04L 67/125* (2013.01); *H04L 67/42* (2013.01)

(58) Field of Classification Search
USPC ........................................................ 320/109
See application file for complete search history.

(56) References Cited

U.S. PATENT DOCUMENTS

| | | | |
|---|---|---|---|
| 2011/0202418 A1* | 8/2011 | Kempton | B60L 11/1824 705/26.1 |
| 2012/0095830 A1* | 4/2012 | Contreras Delpiano | G06Q 30/02 705/14.49 |
| 2013/0184886 A1* | 7/2013 | Pollack | G05D 11/00 700/291 |

OTHER PUBLICATIONS http://www.evconnect.com/charging-station-management-software/" download date Jan. 13, 2015.
http://chargedevs.com/newswire/japanese-ev-makers-collaborate-to-build-a-single-charging-network/; download date Jan. 13, 2015.

* cited by examiner

*Primary Examiner* — Robert Grant
(74) *Attorney, Agent, or Firm* — Quinn IP Law

(57) ABSTRACT

A network includes vehicle(s) having a battery pack and vehicle telematics unit (VTU), and a server. A server in communication with the VTUs and remote client device(s) is programmed to receive vehicle information from the VTU, including an energy throughput value defined by charging power delivered to the battery pack during an active charging event. The server receives utility information and a load adjustment request from the remote client device, including a power interrupt permission status describing whether interruption of power by a host of the client device is permitted. Charging control signals are transmitted in response to the load adjustment request to enable or postpone the charging event. Energy throughput is recorded over multiple active charging events, which are then combined or aggregated. Output data, e.g., a bill or report describing the aggregated energy throughput values, may be generated by the server. A method and server are also disclosed.

15 Claims, 2 Drawing Sheets

ENERGY USE AGGREGATION AND CHARGE CONTROL OF A PLUG-IN ELECTRIC VEHICLE

TECHNICAL FIELD

The present disclosure relates to a charging network that aggregates energy use and enables charging control of plug-in electric vehicles.

BACKGROUND

Plug-in electric vehicles (PEVs) such as certain hybrid electric vehicles, extended-range electric vehicles, and battery electric vehicles include a rechargeable battery module that powers one or more high-voltage electric traction motors. The battery module of a PEV can be recharged via an offboard charging source when the PEV is not being driven. PEV owners may charge their vehicles as part of their normal household electrical load. As an alternative approach, PEV owners may have the option of installing a separate electric meter at their home, office, or other desired charging location to more closely track their electrical use during vehicle charging. In some areas, separate electric metering may allow a PEV owner to take advantage of reduced electrical utility rates. However, separate metering and existing vehicle charging infrastructure may remain less than optimal in certain respects.

SUMMARY

A vehicle charging network is disclosed having one or more plug-in electric vehicles each having a rechargeable battery pack and a vehicle telematics unit (VTU). The network also includes a server having a processor, memory, and a transceiver in communication with the VTU(s). The server is in communication with a remote client device and is programmed to receive vehicle information from each VTU via the transceiver, including a geographic location and a power usage/energy throughput value of the vehicle, i.e., an amount of electrical charging power delivered to the battery pack during an active charging event. The server also selectively transmits charging control signals to the VTU in response to a load adjustment request from the remote client device. The charging control signals cause the VTU to enable charging or postpone/interrupt charging during the active charging event, with the actual charging control action or decision depending on the load adjustment request. Energy throughput of each vehicle is determined over time at multiple active charging events and then combined/aggregated by the server over a calibrated duration or number of the active charging events. The server additionally generates output data describing the aggregated energy throughput values, thereby reporting the energy use or charging history of the vehicle to the owner/operator of the vehicle as well as to the utility or other service providers.

A method includes receiving, via a transceiver of a server, vehicle information from a VTU of a plug-in electric vehicle having a battery pack, including a geographic location and an energy throughput value of the vehicle defined by an amount of charging power delivered to the battery pack during an active charging event. The method also includes receiving utility information and a load adjustment request from the remote client device via the transceiver, including a power interrupt permission status of the vehicle describing whether an interruption of power by a host of the client device is permitted by the operator of the vehicle.

Additionally, the method includes transmitting charging control signals to the VTU from the server in response to the load adjustment request to enable, postpone, or temporarily interrupt an active charging event, as well as determining the energy throughput value of the vehicle at a plurality of the active charging events. Energy throughput values are aggregated over a calibrated duration or number of active charging events. The method further includes generating output data describing the aggregated energy throughput values.

A server is also disclosed for a vehicle charging network having a plurality of remote client devices and a plurality of plug-in electric vehicles each having a rechargeable battery pack and a VTU. The server includes a processor, memory, and a transceiver in communication with the VTUs. The server, which is in communication with the remote client devices, is programmed to receive vehicle information from each VTU, including a corresponding location of each vehicle and a state of charge and a charging status of each battery pack. The server may receive a load adjustment request, i.e., a load reduction request or a load increase request, from at least one of the remote client devices, and may change a setting of a corresponding charging timer of the vehicles remotely via transmission of charging control signals to the VTU of each respective vehicle in response to the received load adjustment request. The transmitted charging control signals may postpone or enable charging of the battery packs.

Additionally, the server determines an energy throughput value at each of a plurality of active charging events using the vehicle information from the VTUs. The energy throughput value defines an amount of charging power delivered to the corresponding battery pack of the vehicle during a corresponding one of the active charging events. The server aggregates the determined energy throughput values over a calibrated duration and generates output data describing the aggregated energy throughput values.

The above features and other features and advantages of the present disclosure are readily apparent from the following detailed description of the best modes for carrying out the disclosure when taken in connection with the accompanying drawings.

DETAILED DESCRIPTION

Figure 1:
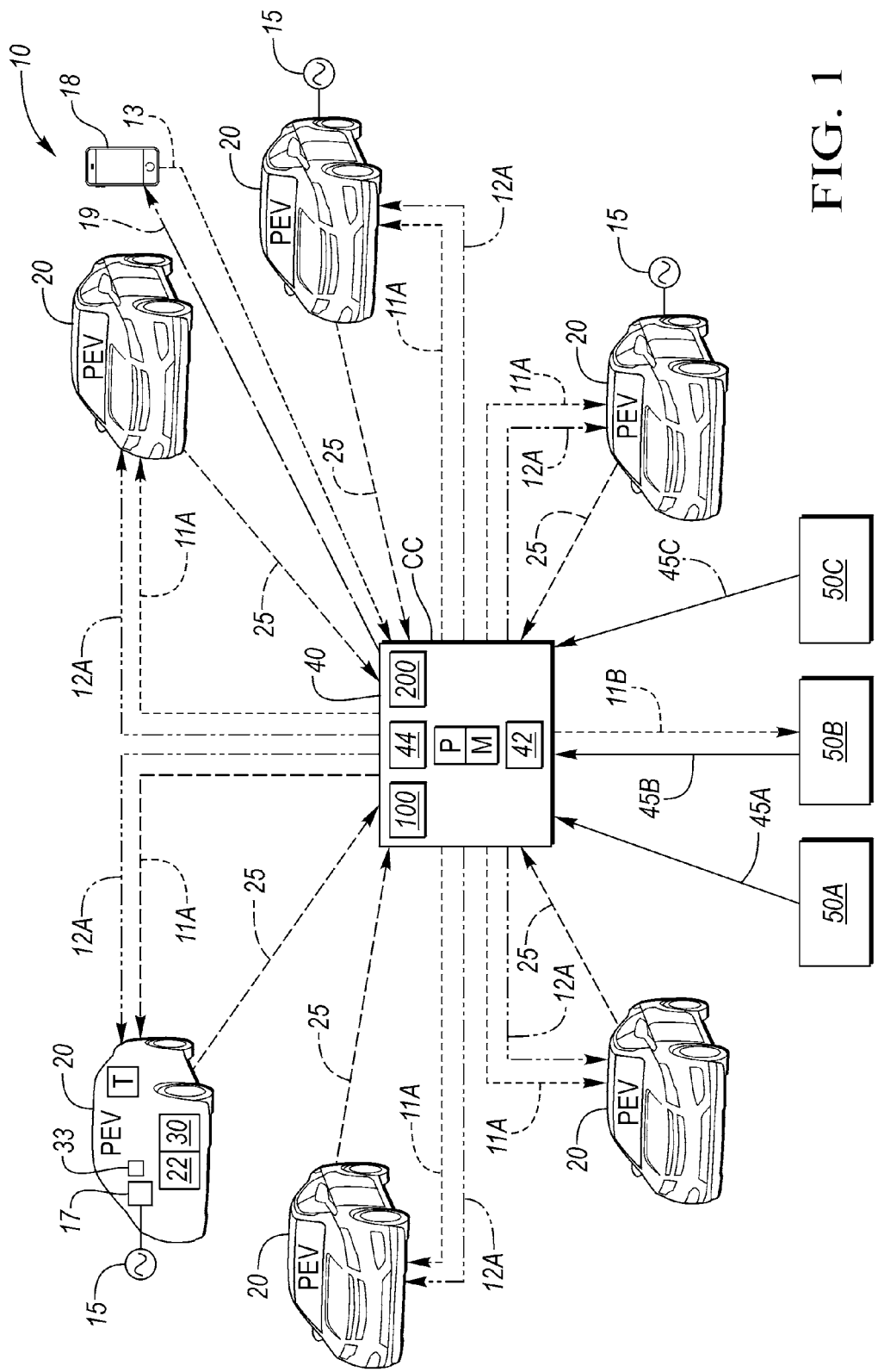
FIG. 1 is a schematic illustration of an example vehicle charging network for a plug-in electric vehicle (PEV) configured as set forth herein.

Referring to the drawings, wherein like reference numbers refer to like components, and beginning with FIG. 1, a vehicle charging network 10 is shown schematically in FIG. 1 having a plurality of plug-in electric vehicles 20, a charging center (CC) having a server 40, and a plurality of client devices 50A, 50B, and 50C. The server 40 is in remote cellular or radio communication with the client devices 50A, 50B, and 50C and with each of the vehicles 20.

As used herein, the term "plug-in electric vehicle" refers to any battery electric, hybrid electric, or extended-range electric vehicle having a battery pack 22 that can be selectively recharged as needed via an offboard power supply 15, e.g., a standard voltage or a high-voltage charging outlet or a commercial charging station. Depending on the design, plug-in electric vehicles may also be recharged while in use via regenerative braking as is well known in the art. While omitted from FIG. 1 for illustrative simplicity, the vehicles 20 include, in addition to the battery pack 22, an electrical system having an auxiliary power module, an onboard charger, a power inverter module, and one or more electric traction motors/motor-generator units suitable for generating torque for propelling the vehicle 20.

Additionally, each vehicle 20 of FIG. 1 may include an electrical contactor 17, i.e., an electrical switch or relay, as well as a charging timer T and a vehicle telematics unit (VTU) 30. The contactor 17 can be opened in response to a command from the VTU 30 to thereby break an electrical path between the offboard power supply 15 and the battery pack 22 and closed to commence charging of the battery pack 22. Opening and closing of the contactor 17 may be determined via a setting of the charging timer T, which in turn may be modified via the VTU 30 by the server 40 as set forth below.

Receipt of charging control signals (arrow 12) from the server 40 by a given VTU 30 enable onboard charging control actions to occur in response to changing load requirements as determined by the client devices 50A, 50B, and/or 50C and relayed to the vehicles 20 via the server 40. Such charging control signals (arrow 12) enable charging of the battery pack 22, for instance by closing the contactor 17 and/or setting the timer T to a present or future time depending on the user's known rate/off-peak/on-peak charging preferences. As explained below, if required the charging control signals (arrow 12) can cause the contactor 17 to open by operation or command of the VTU 30 and thereby break an electrical path between the offboard power supply 15 and the battery pack 22. Such a control action would interrupt an active charging operation. Alternatively, the charging control signals (arrow 12) may operate by changing a setting on the timer T, a control action which controls operation of the contactor 17 and thus postpones charging. While described below separately with reference to FIGS. 2 and 3, respectively, method 100 and 200 may be encoded as a single algorithm and executed via the server 40 to achieve the desired power aggregation and charging control ends described below.

The server 40 of FIG. 1 may be embodied as one or more computer devices specially configured, i.e., programmed in software and equipped in hardware, to execute methods 100 and 200. Execution of these methods 100 and 200 quantifies, aggregates, monitors, and controls the charging energy throughput of each of the vehicles 20 in the network 10. The server 40 may include sufficient amounts of the memory (M) and a processor P. The memory (M) can include, by way of example, optical or magnetic read only memory (ROM), random access memory (RAM), electrically-erasable programmable read only memory (EEPROM), etc., of a size and speed sufficient for executing the methods 100 and 200.

The server 40 of FIG. 1 is also equipped with other required computer hardware, such as a high-speed clock, requisite analog-to-digital (A/D) and digital-to-analog (D/A) circuitry, any necessary input/output circuitry and devices (I/O), as well as appropriate signal conditioning and/or buffer circuitry. Any algorithms resident in the server 40 or accessible thereby can be stored in memory (M) and automatically executed by processor (P) to provide the respective functionality.

More specifically, the server 40 of FIG. 1 may include a transceiver 44 that communicates directly with a VTU 30 positioned aboard each respective vehicle 20 operating in the network 10. Control and coordination via the server 40 may be a contracted-for service, i.e., an owner of a given vehicle 20 subscribes to a charge aggregation and/or charge control service offered by a host, e.g., owner or operator, of the server 40 in conjunction with the hosts of the various client devices 50A, 50B, and 50C, typically utility companies or energy suppliers and thereby become part of the network 10. Thus, the control actions described herein are intended to occur as part of a voluntary or subscriber-based service to optimize the ownership experience of drivers of the plug-in electric vehicles 20.

As is well known in the art, a telematics unit such as the VTU 30 in each vehicle 20 is a computer device used to integrate telecommunications, vehicle information, and communications technologies aboard a vehicle and to send, receive, and store such information. Telematics devices are capable of gathering data from an existing on-board diagnostics (OBD-II) system of each vehicle 20, and of using global positioning system (GPS) capabilities to precisely track the location of the vehicle 20 in which the VTU 30 is hosted. An existing controller area network (CAN) bus may be used to monitor the status of various electronic control units and systems aboard the vehicle 20 as part of typical telematics functionality.

Utility providers or energy companies may host the client devices 50A, 50B, and 50C as noted above. Such client devices 50A, 50B, and 50C at minimum include another computer device configured with similar hardware to that described above with respect to the server 40, e.g., a processor, memory, and associated hardware. The client devices 50A, 50B, and 50C are programmed to provide utility information (arrows 45A, 45B, and 45C) to the server 40 as part of the methods 100 and 200 as explained below. While only three client devices 50A, 50B, and 50C are shown for illustrative simplicity, any number of such client devices may be used in the network 10. However, as utility companies typically operate over a fairly large geographic area, the network 10 may be expected to include a relatively limited number of such client devices.

During peak load periods, a given utility company may take certain preemptive control actions with respect to limiting the amount of power supplied to its customer base. Such actions, which are necessary to keep the power grid stable, may include starting additional power generating assets and interrupting certain loads that are under utility control, e.g., via an interruptible contract directly with the user's facility, or cycling businesses or neighborhoods offline to prevent larger collapses in voltage. Alternatively, the utility company may coordinate charging at off-peak hours and/or when power generation by alternative energy sources such as wind, hydro, or solar energy sources is prevalent, e.g., during periods of high wind in the case of wind energy as determined by the client devices 50A, 50B, and/or 50C.

As an extension of such contract-based interruptible service, the present methods 100 and 200 make real-time vehicle charging data available via the VTU 30 of each vehicle 20, such that individual utilities can allow on-peak charging via the server 40 when overall grid loads are low, or can postpone or interrupt charging to certain vehicles 20 when overall grid loads are high. The server 40 can make this determination on a vehicle-by-vehicle basis depending on the totality of the vehicle information (arrows 25) provided to the server 40 automatically via each of the vehicles 20 in the network 10.

In the present method 100 in particular, each VTU 30 transmits respective vehicle information (arrow 25) to the server 40 to describe, for instance, a present charging on/off status of that particular vehicle 20, a state of charge (SOC) of the battery pack 22, the geographic coordinates or charging location of a given present or ongoing charging event, a fuel level of the vehicle 20 if applicable, i.e., if the vehicle 20 is a hybrid electric or an extended-range electric vehicle, and energy throughput/power draw occurring during the present charging event.

As it may not be possible to read a given utility-provided meter directly, a processor of the VTU 30 or another control unit of the vehicle 20 may calculate the energy throughput based on the rate of change in the SOC, the voltage or current rating of the charging source 15, and the duration of active charging. Optionally, an electrical power meter 33 may be used to measure and report to the VTU 30 the charging energy consumed in a given charging event.

The vehicle information (arrows 25) from each vehicle 20 of FIG. 1 may also include charging preferences or other vehicle-related preferences of an owner or operator of the vehicle 20, such as peak/off-peak charging preferences and/or a maximum utility rate the owner/operator of the vehicle 20 is willing to pay a utility company hosting a given client device 50A, 50B, or 50C for charging and/or a charging interrupt contract status, i.e., whether the owner/operator has signed a contract agreeing to intermittent interruption of service. Such an interrupt status could be used by a utility provider, via the charging center (CC), to selectively postpone or interrupt charging of a given vehicle 20 within the network 10 for a temporary load reduction in the network 10, as set forth in the example embodiment of method 200 of FIG. 3.

The server 40 of FIG. 1 may also include a client database 42. The client database 42 may contain, for instance, customer identifying information such as vehicle identification number or a unique identifying PIN, each customer's charging plan, e.g., basic, managed off-peak, or interruptible, the charge capacity of the battery pack 22, a list of confirmed or approved charging locations, and the like. The server 40 processes the vehicle information (arrow 25) in conjunction with the utility information (arrows 45A, 45B, and 45C) from each of the client devices 50A, 50B, and 50C. The utility information (arrows 45A, 45B, and 45C) describes the current rate plans, charging rates for peak, off-peak, or interruptible charging service, the specific utility company or resource providing the charging power, and any load reduction requests requiring the network 10 to reduce power consumption.

Optionally, the server 40 of FIG. 1 may be programmed to transmit an alert message (arrow 19) to the vehicle 20 or, as shown, to a user device 18 such as a smartphone, a computer, a touchscreen, or any other user input device located within or external to the vehicle 20. The alert message (arrow 19) may describe the impending control action of the server 40, such as via an alert "charging will commence in 5 minutes", "charging will commence in 5 minutes due to a preferred rate/resource", "charge interrupt will commence in 30 minutes", "charging will be delayed for 1 hour", and/or a display of a suitable icon or graphic to sufficiently alert the owner or operator of the vehicle 20 as to the timing and nature of the impending control action. In such an embodiment, the server 40 may be programmed to receive and process a confirmation signal (arrow 13) from the user device 18. In some configurations, the confirmation signal (arrow 13) may include content that either agrees to the impending action or rejects the impending action.

For instance, while a given operator of a vehicle 20 may have previously contracted for interruptible charging service, for various reasons the same operator may not be able to permit such an action at the moment the action is to take place, whether due to maintenance issues, scheduling, or the like. In such an instance, the operator may transmit the confirmation signal (arrow 13) declining the interruption. Such a decision may have consequences in terms of fees or other penalties imposed by the server 40 and/or the hosts of the client devices 50A, 50B, 50C. In some scenarios the load on the grid may be sufficiently high that the client devices 50, 50B, and/or 50C, via the server 40, may override the operator's desired control action.

As part of the methods 100 and 200, the server 40 of FIG. 1 is able to generate, for each vehicle 20 in the network 10, a set of output data 11A and the charging control signals (arrows 12). For instance, the output data 11A may include a summary of the total energy consumed by a given vehicle 20 in kWh, the percent of on-peak and off-peak charging, and the rates applied to such consumption. The output data 11A may also include a monthly energy bill detailing the energy charges, any low-carbon fuel credits, charge interruption events, and a net charge for the month. Any entity hosting the server 40 may therefore operate as a third party billing operation or intermediary between the client devices 50A, 50B, and 50C, which may be hosted by utility companies, and the owners of the vehicles 20.

That is, regardless of where in the network 10 a given vehicle 20 charges during a given billing cycle, the total energy use by that specific vehicle 20 is isolated from all other charging occurring in the network 10 and is aggregated by the server 40. As a result, any facility or residence hosting the charging event is not separately charged for the same energy use. In other words, power use by a given vehicle 20 is effectively intercepted from all confirmed or registered charging locations and consolidated into a single vehicle energy bill for that particular vehicle 20, without impacting the user's residential bill or that of the owner or resident of the point of charge.

As an example, an operator of a vehicle 20 operating in the network 10 of FIG. 1 may begin a given day by charging the vehicle 20 at home before traveling to work. Additional charging of the vehicle 20 may take place while the operator is at work. Later that same day, the same vehicle 20 may travel to another location in the network 10 such as another building or residence where additional charging takes place. Rather than visiting a commercial charging location or using a specific charge card to capture charging and billing at each location, the owner of the vehicle 20 as set forth herein periodically receives the output data 11A from the server 40, with the client devices 50A, 50B, and 50C receiving a portion 11B of the output data 11A describing the energy throughput supplied by that particular provider. While the output data 11A is shown as being transmitted to the vehicle 20 in FIG. 1, in other embodiments the output data 11A may include a report or an online-accessible account providing such information, with such options provided directly to the owner/operator without having to be transmitted to the vehicle 20.

Upon receipt of the output data 11A, the owner of the vehicle 20 can submit payment to a host of the server 40, which then allocates and distributes the payment to the various utilities or other hosts of the client devices 50A, 50B, and/or 50C providing for the total energy as reported in the monthly bill less any fees for providing the third party billing services. Other commercial approaches may be envisioned such as the server 40 billing for each utility separately such that the owner of one of the vehicles 20 of FIG. 1 receives bills from each utility, as prepared by the entity hosting the server 40.

Figure 2:
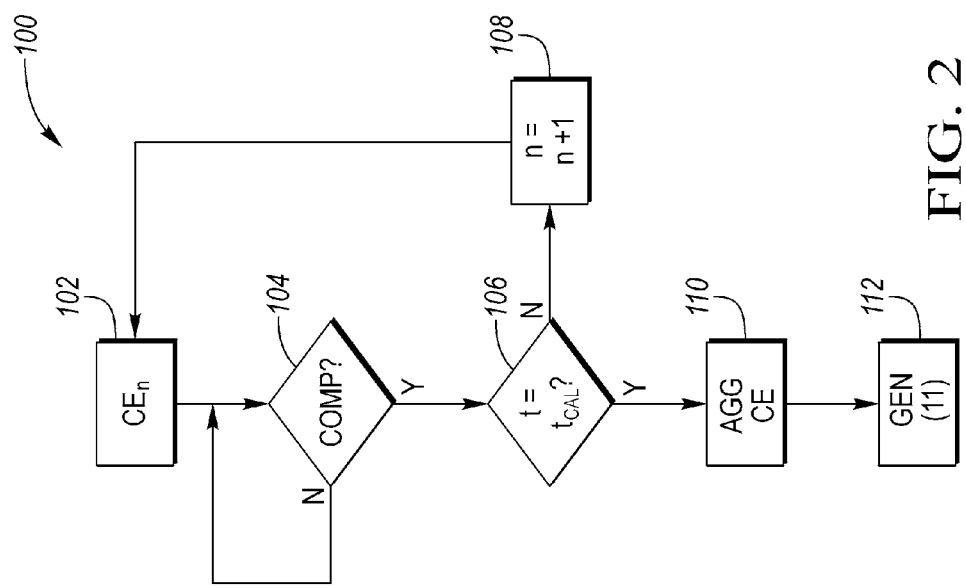
FIG. 2 is a flow chart describing an example embodiment of a method for aggregating energy throughput of a PEV.

Referring to FIG. 2, an illustrative example of the method 100 is described for a charge of one vehicle 20 of the type shown in FIG. 1 and described above. The method 100 begins at step 102 wherein the vehicle 20 initiates a charging event CE0, with n corresponding to a charging event number. A charging event may entail an operator plugging the vehicle 20 into a given energy source 15, the VTU 30 and server 40 then identifying the energy source 15 in terms of its location and ownership or operating control with respect to the client devices 50A, 50B, and 50C, the VTU 30 commanding an automatic closing of the contactor 17, and the commencement of an active charging operation of the battery pack 22. The method 100 proceeds to step 104 as the charging event continues.

Step 104 entails determining whether the charging event initiated at step 102 is complete. For example, the VTU 30 may determine, from the state of charge of the battery pack 22, whether the present charge event is complete. If so, the VTU 30 automatically transmits the vehicle information (arrow 25) describing the power use during the just-completed charging event to the server 40. The server 40 is thus apprised of the precise charging location and power usage of the vehicle 20, as well as the identity of the vehicle 20, e.g., via its vehicle identification number or other unique identifying information, and thus the identity of the owner/operator of that vehicle 20. The method 100 remains at step 104 until the charging event is finished and then proceeds to step 106.

At step 106, the server 40 of FIG. 1 may determine whether a predetermined amount of time ($t_{CAL}$) has passed, e.g., one month or other suitable billing cycle period. If so, the method 100 proceeds to step 110. The method 100 otherwise proceeds to step 108.

Step 108 includes incrementing the charging event number, i.e., n=n+1. Thus, the second charging event in a given cycle is charging event 2, and so forth. The method 100 then repeats step 102.

Step 110 includes aggregating the n charging events (n=1, 2, . . . ) from steps 102-108. As explained above, the host of the server 40 may be a third party billing provider, in which case the aggregation occurring in step 110 includes collecting all of the charging history of a given vehicle 20 for a given billing cycle. The method 100 then proceeds to step 112.

At step 112, the server 40 generates the output data (arrow 11) described above with reference to FIG. 1. Step 112 may include transmitting a bill and/or charging report to the owner of the vehicle 20 as explained above. Additionally, step 112 may include reporting the output data (arrow 11) to the various providers or hosts of client devices 50A, 50B, and 50C. This allows the utility companies or other service providers to be made aware of the power usage of each vehicle 20. In practice, therefore, an operator charging a vehicle 20 at a particular facility, and not the owner of that facility, would receive a bill for the charge event. Such a result could alleviate some of the existing challenges toward billing of electrical vehicle charging events at other than customer-owned or card/PIN-equipped charging stations.

Figure 3:
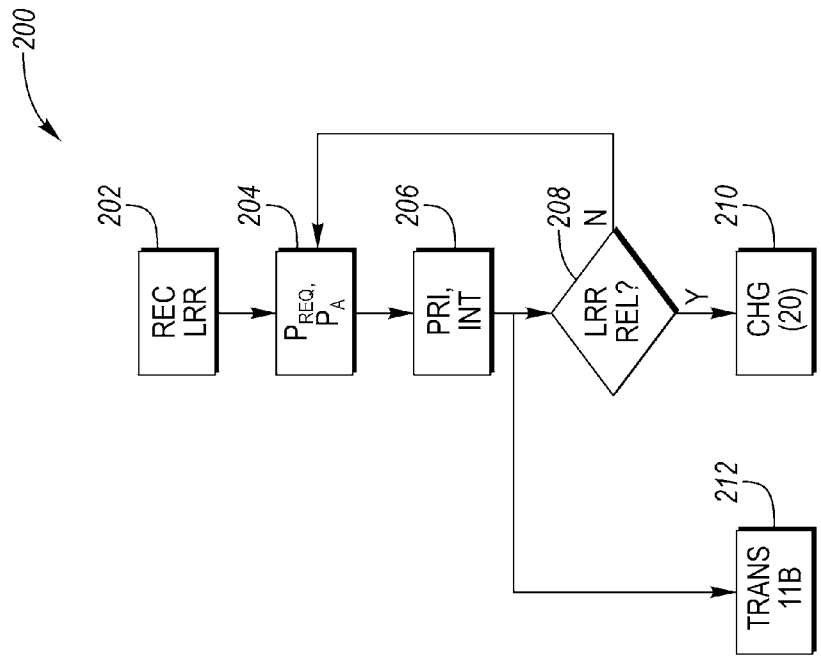
FIG. 3 is a flow chart describing an example embodiment of a method for controlling a charging operation of a PEV in response to a load reduction request within the vehicle charging network shown in FIG. 1.

Referring to FIG. 3, the method 100 may be used in conjunction with a method 200 for managing a load request within the network 10 of FIG. 1. While vehicles 20 are actively charging or operating within the network 10, the server 40 remains in communication with each of the client devices 50A, 50B, and 50C, i.e., the utilities or energy providers. Method 200 describes an example of a load adjustment request in the form of a load reduction request, i.e., a request on the part of one or more of the client devices 50A, 50B, and/or 50C to reduce the electrical load on the grid. Those of ordinary skill in the art will appreciate that the server 40 can also increase the load on the grid in response to a load adjustment request from one or more of the client devices 50A, 50B, and/or 50C, e.g., to charge one or more vehicles 20 at a given time due to a change in utility rates to lower off-peak rates, an increase in alternative energy power generation such as during periods of high wind, and the like.

At any time based on the load on the entire power grid, at step 202 the server 40 may receive a load reduction request (LRR) from one or more of the client devices 50A, 50B, and/or 50C of FIG. 1. For example, a given utility may request a reduction in usage of a designated number of kilowatts within a designated geographic load region. The method 200 proceeds to step 204 upon receipt by the server 40 of such a load reduction request.

At step 204, the server 40 evaluates each of the vehicles 20 presently in the network 10 to determine a status of each vehicle 20. Step 204 includes determining which of the vehicles 20 have contracted with the client devices 50A, 50B, and/or 50C for interruptible service, which vehicles 20 are presently charging, and the SOC and fuel level, if appropriate, of the charging vehicles 20. Of the charging vehicles 20 in the network 10, the server 40 may calculate the total possible power reduction (PA) in response to the load reduction request, doing so based on the power draw of each vehicle 20 participating in an interruptible contract, i.e.:

$$P_A = (P_{A1} + P_{A2} + P_{A3} \ldots + P_{An})$$

By knowing via the VTU 30 the current power draw of each vehicle 20, i.e., $P_{A1}$, $P_{A2}$, etc., the server 40 can calculate PA. The method 200 then proceeds to step 206.

At step 206, the server 40 may set a charging priority (PRI) for the vehicles 20 in the network 10 to help meet the load reduction request of step 202. The charging priority may include assigning a higher charging priority to a given vehicle 20 with interruptible (INT) charging service having a relatively low volume of fuel in its tank than a vehicle 20 having interruptible service and full tank of fuel. Likewise, vehicles 20 that are battery electric may be assigned a higher charging priority given the lack of fuel aboard such vehicles 20 for onboard power generation. The state of charge of the vehicle battery pack, as communicated via the VTU 30, may also be used by the server 40 in setting priority. For example, a vehicle 20 with a nearly full (high state of charge) battery pack 22 will be interrupted before a vehicle 20 with a nearly depleted (low state of charge) battery pack 22.

Step 206 also includes transmitting the charging control signals (arrow 12) to each charging vehicle 20 within the network 10 as shown in FIG. 1. The result of step 206, depending on the load reduction request and whether the total possible power reduction (PA) from step 204 is less than or greater than the load reduction request, will be a postponement or interruption of an active charging event for some vehicles 20. Other vehicles 20 may experience no change in charging. If the load reduction request of step 204 is substantial, however, all vehicles 20 may be temporarily prevented from charging to meet that load request.

As part of step 206, the server 40 of FIG. 1 may prioritize charging based on scheduled vehicle charge time and rate preference. Such information may be provided via the VTU 30 from a setting of the onboard charging timer (T), which is part of the vehicle information (arrow 25) transmitted to the server 40. Based on the scheduled charge times and charging rates, the server 40 can prioritize the vehicles 20 for interruption of service, and can then transmit an interrupt request as part of the charging control signals (arrow 12) to the VTU 30 of affected vehicles 20. The charging control signals (arrow 12) can also change the timer setting of the charging timer (T) as part of this step, i.e., automatically adjust the timing of charging for the vehicle 20 so as to comply with the owner's predetermined peak/off-peak charging rate preferences. The method 200 then proceeds to steps 208 and 212.

At step 208, the server 40 determines, via communication with the client devices 50A, 50B, and 50C, whether the load reduction request of step 202 has been released. That is, when a given utility company no longer requires load reduction on the grid, it may communicate this decision to the server 40 via the utility information (arrows 45A, 45B, and 45C). The method 200 proceeds to step 210 if such a release is received at step 208. Otherwise, the method 200 repeats step 204 and continues to prioritize or reprioritize charging of the vehicles 20 based on their changing charging status as set forth above. So that vehicles 20 are not cycled on and off as part of this process, the server 40 may apply a minimum off time for interrupted vehicles 20, e.g., one hour, before reprioritizing the charging order.

Step 210 includes transmitting the charging control signals (arrows 12) to the vehicles 20 to command resumption of full or unrestricted charging of the vehicles 20 in the network 10 of FIG. 1. Once all load reduction enforcement has ceased, the server 40 may generate a report or append the load reduction event into the output data (arrow 11A) for any affected vehicles 20.

Step 212 includes transmitting the provider portion 11B of the output data 11A from the server 40 to one or more of the client devices 50A, 50B, and/or 50C. Step 212 may be executed periodically or continuously during charging to keep the hosts of the client devices 50A, 50B, and 50C informed as to the charging status of the vehicles 20. For example, after prioritization at step 206 the server 40 can inform the client devices 50A, 50B, and/or 50C as to efforts to meet the load reduction request of step 202, including the total possible power reduction (PA) from step 204. This step ensures that compensation for load reduction efforts, often in the form of reduced electricity rates or billing credits, are received in accordance with agreed-upon terms.

After step 210 a final transmission of the provider portion 11B of the output data 11A is sent to the affected client devices 50A, 50B, and/or 50C to inform the hosts of the client devices 50A, 50B, and/or 50C as to the energy use. As noted above, the provider portion 11B sent to the client devices 50A, 50B, 50C describes or reports the energy throughput supplied to a given vehicle 20 by that particular service provider. Step 212 ensures that the information provided to the owner/operator of each vehicle 20 is also reported to the service provider that supplies the energy used during charging.

As will be appreciated by one of ordinary skill in the art, the capture and aggregation of individual charging data via the network 10 of FIG. 1, as achieved via method 100 of FIG. 2, can be used to facilitate the low carbon fuel standard credit programs, including the generation, sale, and exchange of such credits. As utilities would be able to precisely determine the vehicle-specific charging on a monthly basis in kilowatt hours (kWh), this information can be bundled by the server 40 into equivalent zero-carbon "gallons", e.g., 22.4 California grid mix kWh=1 zero-carbon gallon. This information in turn could be used in conjunction with existing renewable energy certificate (REC) programs, a form of zero-carbon electricity trading units, to further reduce the carbon footprint of the electricity used, e.g., 11.2 REC kWh=1 zero-carbon gallon.

Additionally, use of the network 10 and the methods 100 and 200 described above with reference to FIGS. 1-3 allows dynamic control of peak and off-peak charging, along with load response, via an existing VTU 30. Similar to the method 200, that is, the server 40 can turn on charging of any of the vehicles 20 in the network 10 of FIG. 1 as needed to take advantage of lower rates and/or other known charging preferences of the various operators. This capability in turn allows the user to take advantage of lower electric vehicle charging rates without affecting a usage total or rates of the user's residence or any other power supply owner. Time-based and interruptible contracts applying to the vehicles 20 are thus enabled via the disclosed approach.

While the best modes for carrying out the present disclosure have been described in detail, those familiar with the art to which this disclosure relates will recognize various alternative designs and embodiments within the scope of the appended claims.

The invention claimed is:

1. A vehicle charging network comprising:
   a plurality of vehicles each having a respective rechargeable battery pack and a respective vehicle telematics unit (VTU); and
   a server having a processor, memory, and a transceiver in communication with the VTUs, wherein the server is in communication with a remote client device and is programmed to:
      receive vehicle information from the VTUs via the transceiver, including a location of each of the vehicles, an amount of electrical charging power delivered to the battery packs during an active charging event, and a fuel level of at least some of the vehicles;
      transmit charging control signals to the VTUs in response to a load adjustment request from the remote client device to thereby cause the VTUs to control the active charging event and at least partially satisfy the load adjustment request;
      record, as an energy throughput value, the amount of electrical charging power delivered to the vehicles over time for a plurality of the active charging events;
      aggregate a plurality of the recorded energy throughput values over a calibrated duration or a calibrated number of prior active charging events;
      generate output data describing the aggregated energy throughput values; and
      prioritize charging of each of the vehicles based on the received vehicle information, including the fuel levels.

2. The vehicle charging network of claim 1, wherein the load adjustment request is a load reduction request, and wherein the transmitted charging control signals temporarily postpone the active charging event.

3. The vehicle charging network of claim 2, wherein the vehicle has an electrical contactor, and wherein receipt of the charging control signals by a respective one of the VTUs causes the respective electrical contactor to open and thereby break an electrical path between the respective battery pack and an offboard power supply to thereby temporarily postpone the active charging event.

4. The vehicle charging network of claim 1, wherein the transmitted charging control signals enable the active charging event.

5. The vehicle charging network of claim 1, wherein each of the vehicles has a respective charging timer, and wherein receipt of the charging control signals by the VTUs causes the VTUs to change a setting of the respective charging timer to postpone the active charging event.

6. The vehicle charging network of claim 1, wherein the load adjustment request is a load reduction request, and wherein the server is programmed to calculate a total possible power draw of the plurality of vehicles and transmit the charging control signals to at least partially satisfy the load reduction request.

7. The vehicle charging network of claim 1, wherein the server is programmed to transmit an alert message describing an impending control action of the server, and to receive and process a confirmation signal from a user device in response to the alert message.

8. A method comprising:
receiving, via a server, vehicle information from a vehicle telematics unit (VTU) of each of a plurality of vehicles, each of the vehicles having a respective battery pack, the vehicle information including a location of the vehicle, an amount of electrical charging power delivered to the battery packs during an active charging event, and a respective fuel level of at least some of the vehicles;
receiving a load adjustment request from a remote client device;
transmitting charging control signals to the VTUs in response to the load adjustment request to thereby cause the VTUs to control the active charging event and at least partially satisfy the load adjustment request;
determining, as an energy throughput value, the amount of electrical charging power delivered to each of the vehicles over time for a plurality of the active charging events;
aggregating, via the server, a plurality of the recorded energy throughput values over a calibrated duration or a calibrated number of prior active charging events;
generating output data, via the server, describing the aggregated energy throughput values; and
prioritizing an order of charging based on the received vehicle information from each of the vehicles, including the respective fuel levels.

9. The method of claim 8, further comprising calculating a total possible power draw of the plurality of the vehicles via the server in response to receiving the load adjustment request.

10. The method of claim 8, wherein each of the vehicles includes a respective charging timer, and wherein transmitting the charging control signals includes transmitting a request for a change of a setting of the charging timers.

11. The method of claim 8, further comprising transmitting an alert message via the server to a user device describing an impending control action of the server; and
receiving and processing a confirmation signal from the user device in response to the alert message.

12. A server for a vehicle charging network having a plurality of remote client devices and a plurality of plug-in electric vehicles each having a respective rechargeable battery pack and a respective vehicle telematics unit (VTU), the server comprising:
a processor;
memory; and
a transceiver in communication with the VTUs, wherein the server is in communication with the remote client devices and is programmed to:
receive vehicle information from the VTUs, including a location of each of the vehicles, a fuel level of at least some of the vehicles, and a corresponding state of charge and charging status of each of the battery packs;
receive a load adjustment request from at least one of the client devices;
change a setting of a respective charging timer of each of the vehicles remotely via transmission of charging control signals to the VTUs in response to the received load adjustment request to thereby postpone or enable charging of the battery packs;
determine an energy throughput value at each of a plurality of active charging events using the vehicle information from the VTUs, wherein the energy throughput value defines an amount of charging power delivered to the battery packs during a corresponding one of the active charging events;
aggregate the determined energy throughput values over a calibrated duration;
generate output data describing the aggregated energy throughput values; and
prioritize charging of the vehicles using the received vehicle information, including the respective fuel levels.

13. The server of claim 12, wherein the server is programmed to:
receive utility information including a power interrupt permission status of the vehicle describing whether an interruption of charging power is permitted;
receive, as the load adjustment request, a load reduction request from at least one of the client devices; and
transmit charging control signals to the VTU to thereby command a temporary interruption of the active charging event when interruption of power is permitted during the load reduction request.

14. The server of claim 12, wherein the server is programmed to calculate a total possible power draw of a plurality of the vehicles in response to the load adjustment request.

15. The server of claim 14, wherein each of the vehicles includes a respective electrical contactor, and the server is further programmed to command the electrical contactors, via the respective VTUs of each of the vehicles, to open an electrical path between the respective battery pack and an offboard power supply in response to the load reduction request.

* * * * *